(12) United States Patent
DeMerchant

(10) Patent No.: US 9,411,991 B2
(45) Date of Patent: *Aug. 9, 2016

(54) REDUCED TRAVEL MAGNETIC STRIP READER MECHANISM

(71) Applicant: Daniel DeMerchant, Meriden, CT (US)

(72) Inventor: Daniel DeMerchant, Meriden, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,366

(22) Filed: Apr. 22, 2015

(65) Prior Publication Data

US 2015/0227765 A1    Aug. 13, 2015

Related U.S. Application Data

(62) Division of application No. 14/184,147, filed on Feb. 19, 2014, now Pat. No. 9,038,906.

(60) Provisional application No. 61/844,079, filed on Jul. 9, 2013.

(51) Int. Cl.
*G06K 19/00* (2006.01)
*G06K 7/08* (2006.01)

(52) U.S. Cl.
CPC ............... *G06K 7/084* (2013.01); *G06K 7/082* (2013.01)

(58) Field of Classification Search
USPC .......................... 235/435, 439, 449, 487, 494
See application file for complete search history.

(56) References Cited

U.S. PATENT DOCUMENTS

| | | | |
|---|---|---|---|
| 4,048,476 A | 9/1977 | Lawter et al. | |
| 4,529,872 A | 7/1985 | Dinges | |
| 4,879,607 A | 11/1989 | Redemacher | |
| 5,912,446 A | 6/1999 | Wong et al. | |
| 6,039,259 A | 3/2000 | Mattson | |
| 9,038,906 B1 * | 5/2015 | DeMerchant | 235/449 |

* cited by examiner

*Primary Examiner* — Matthew Mikels
(74) *Attorney, Agent, or Firm* — DeLio, Peterson & Curcio, LLC; Peter W. Peterson

(57) ABSTRACT

A reader for a card having an information strip, the reader comprising a first movable member, a read head capable of reading the information strip, the read head disposed on the first movable member and a second movable member which upon translation causes the first movable member to translate in a direction opposite to the second movable member. The reader includes a guide slot disposed in line with the direction of translation of the second movable element such that when a card is placed in the guide slot and subsequently moved transversely along the guide slot, the card urges the first movable member in the opposite direction and moving the head across the information strip as the information strip is moved in the opposite direction as the read head movement.

20 Claims, 4 Drawing Sheets

REDUCED TRAVEL MAGNETIC STRIP READER MECHANISM

BACKGROUND OF THE INVENTION

1. Field of the Invention

The present invention relates to magnetically encoded card readers and more specifically to a card reader which allows for an information strip on a card to be read while moving the card less than the length of its magnetic information strip.

2. Description of Related Art

Magnetically encoded credit and debit cards are used in readers accessible to the public. Secondary heads and assemblies can be retrofit by criminals onto existing card readers in order to read customer cards in an unauthorized manner, leading to card data identity theft. The secondary head is placed in a position on the card reader that is in line with the card information strip when the card is placed in the swipe position. The secondary head is typically placed inside or outside of the card reader and in a location that is able to read the card as the user attempts to allow the primary head to read the information strip.

SUMMARY OF THE INVENTION

Bearing in mind the problems and deficiencies of the prior art, it is therefore an object of the present invention to provide a card reader which makes it more difficult for criminals to retrofit a secondary card reader head or assembly into an existing magnetic strip reader.

It is another object of the present invention to provide increased security and allow the user to be in physical contact with their card at all times.

A further object of the invention is to provide a card reader for reading standard magnetic strip bank cards by allowing a card to be swiped only a fraction of the information strip length.

Still other objects and advantages of the invention will in part be obvious and will in part be apparent from the specification.

The above and other objects, which will be apparent to those skilled in the art, are achieved in the present invention which is directed to a reader for a card having an information strip, the reader comprising a first movable member, a read head capable of reading the information strip, the read head disposed on the first movable member and a second movable member which upon translation causes the first movable member to translate in a direction opposite to the second movable member. The reader includes a guide slot disposed in line with the direction of translation of the second movable element such that when a card is placed in the guide slot and subsequently moved transversely along the guide slot, the card urges the first movable member in the opposite direction and moving the head across the information strip as the information strip is moved in the opposite direction as the read head movement. The information strip may be a magnetic information strip. The information strip may include a strip length with the guide slot having a length of about 1.5 times the length of the information strip. The reader may include a cylindrical member engaged with the first movable member and the second movable member. The reader may include an outer shell and a spring attached at one end to the second movable member and attached at the opposite end to the outer shell. The reader may include an outer shell having an upper plate and a lower plate wherein the guide slot is disposed in the upper plate, and may include a lower slot disposed in the lower plate, the card engagable in both the guide slot and the lower slot for allowing the read head to scan the information strip. The reader may include a spring attached at one end to the second member and at the opposite end to the outer shell, the spring urging the second member to an initial position. The reader may include a top edge near the information strip and a bottom edge opposite the top edge wherein the bottom edge is maintained outside of the card reader when the information strip is being read.

Another aspect of the invention is directed to a reader for a card having an information strip, the reader comprising a first elongated arm having a plurality of first teeth along a portion thereof, a read head capable of reading the information strip, the read head disposed on the first elongated arm and a second elongated arm having a plurality of second teeth along a portion thereof. The reader may include a protrusion disposed on the second elongated arm and a pinion gear having a plurality of pinion teeth engagable with the plurality of first teeth and the plurality of second teeth, the first elongated arm and second elongated arm disposed on opposing sides of the pinion such that the rotation of the pinion translates the first elongated arm in the direction opposite the second elongated arm. The reader may include a guide slot disposed in line with the second elongated arm such that when a card is placed in the guide against the protrusion of the second elongated arm and subsequently moved transversely along the guide slot, the card urges the second elongated arm transversely which rotates the pinion, moving the first arm in the opposite direction and moving the head across the information strip as the information strip is moved in the opposite direction as the read head movement.

Another aspect of the invention is directed to a reader for a card having an information strip, the reader comprising a first elongated arm, a read head capable of reading the information strip, the read head disposed on the first elongated arm, a second elongated arm and a protrusion disposed on the second elongated arm. The reader may include a wheel engagable with the first elongated arm and the second elongated arm wherein movement of the second elongated arm rotates the wheel and translates the first elongated arm in a direction opposite the second elongated arm. The reader may include a guide slot disposed in line with the second elongated arm such that when a card is placed in the guide against the protrusion of the second elongated arm and subsequently moved transversely along the guide slot, the card urges the second elongated arm transversely which rotates the wheel, moving the first arm in the opposite direction and moving the head across the information strip as the information strip is moved in the opposite direction as the read head movement. The first elongated arm may include a plurality of first teeth, the second elongated arm may include a plurality of second teeth and the wheel may include a plurality of wheel teeth engagable with the first teeth and second teeth. The reader may include a first member groove wherein the first member is slidable in the first member groove and a second member groove wherein the second member is slidable in the second member groove. The reader may include an outer shell including a first side plate having a first member groove and a second side plate having a second member groove wherein the first member is slidable in the first member groove and the second member is slidable in the second member groove. The reader may include a stop in the second member groove wherein the second member has an initial position having the protrusion adjacent the stop and a swiped position having the protrusion away from the stop. The reader may include a spring attached at one end to the second member and at the opposite end to the outer shell, the spring urging the second member to an initial position adjacent to the stop. The reader may include a spring attached at one end to the second member and at the opposite end to the outer shell, the spring urging the protrusion to an initial position adjacent to the stop.

Another aspect of the invention is directed to a method of using a reader for a card having an information strip, the method comprising providing a first movable member and a read head capable of reading the information strip, the read head disposed on the first movable member The method includes providing a second movable member which upon translation causes the first movable member to translate in a direction opposite to the second movable member and a guide slot disposed in line with the direction of translation of the second movable element such that when a card is placed in the guide slot and subsequently moved transversely along the guide slot, the card urges the first movable member in the opposite direction and moving the head across the information strip as the information strip is moved in the opposite direction as the read head movement. The method may include ensuring the card reader is in an initial condition wherein the read head is adjacent to the second movable member, placing the card within the guide slot with a portion of the information strip positioned adjacent the read head and urging the card in a direction to move the second movable member until the read head moves relative to and along substantially the entire length of the information strip. The first elongated arm may include a plurality of first teeth, the second elongated arm may include a plurality of second teeth and the wheel may include a plurality of wheel teeth engagable with the first teeth and second teeth. The method may include providing a first member groove wherein the first member is slidable in the first member groove and a second member groove wherein the second member is slidable in the second member groove. The reader may include a top edge near the information strip and a bottom edge opposite the top edge, the bottom edge maintained outside of the card reader during the step of urging the card in a direction to move the second movable member.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-13 of the drawings in which like numerals refer to like features of the invention.

Magnetically encoded credit and debit cards are used at widely and publically available readers for a variety of financial transactions. In a typical configuration of the card reader of the present invention, the card is swiped ½ of its length, but the card reader may accommodate different fractions of swipe lengths, depending on how the internal gearing, linkages and transport mechanisms are configured. Typically at the start of a card swipe travel, the lower edge of the card pushes on a member that engages gearing to the read head of the device. The member may be extended to form a shield in order to cover the lower section of the card slot also making it more difficult to tamper with the reader. Member extension may also keep debris out of the reader slot as the lower section of the slot would be covered.

The linkage may be used to move the magnetic swipe head or read head the remainder of the difference of the reader's swipe travel length and the length of the ABA card track length (typically 3.375"). The read head moves linearly in addition to the linear movement of the card travel. Due to the linkage, the linear read rate of the reader head is faster than the card swipe speed. In only moving the physical card a fraction of the total swipe length, it makes it more difficult to install a secondary "skimming" reader or mechanism in the existing reader, as the skimming device would not have the ability to read the entire card track of data since the card is only moved a fraction of its total track distance at any point in travel. Additionally, the reader head may include encryption in order to prevent a skimming circuit to be connected directly to the output of the reader head.

Figure 1:
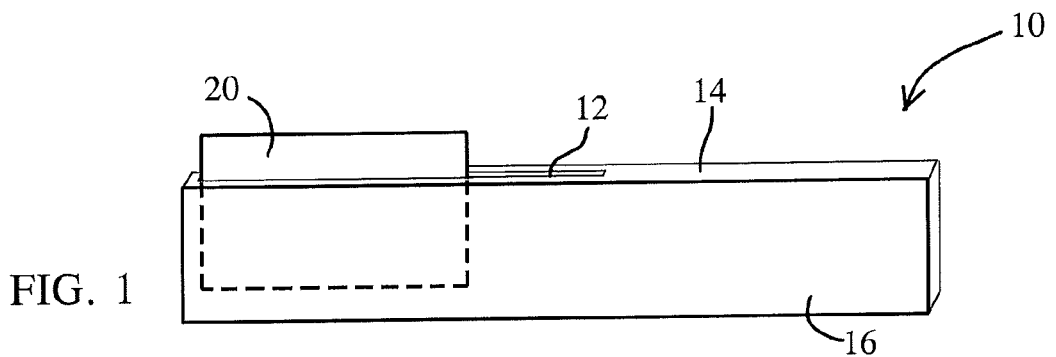
FIG. 1 is a perspective front view of the card reader with the card in the initial position according to the present invention.
Figure 2:
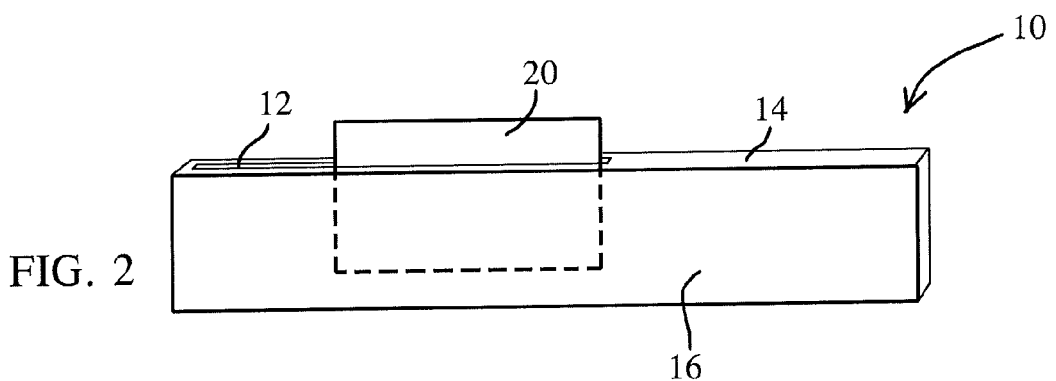
FIG. 2 is a perspective front view of the card reader with the card in the swiped position according to the present invention.
Figure 3:
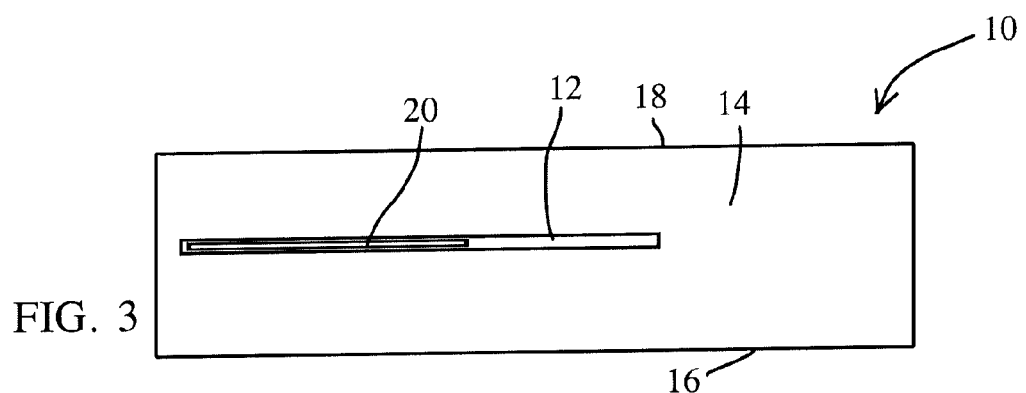
FIG. 3 is a top view of the card reader with the card in the initial position according to the present invention.
Figure 4:
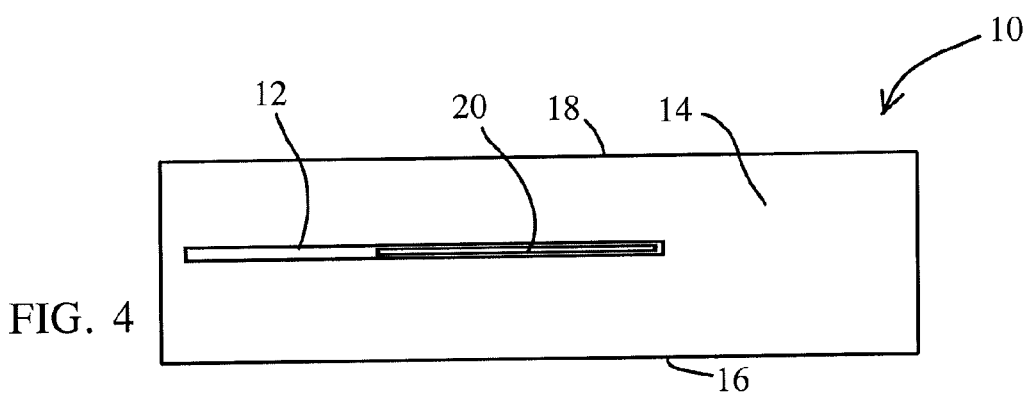
FIG. 4 is a top view of the card reader with the card in the swiped position according to the present invention.

FIGS. 1 and 2 show a perspective side view of the card reader 10 with the card 20 placed in the guide slot 12 located on the top plate 14 in the initial position and in the swiped position, respectively while FIGS. 3 and 4 show a top view of the card reader 10 in the initial position and in the swiped position, respectively. Side plates 16, 18 may be disposed on the sides of the card reader 10.

Figure 5:
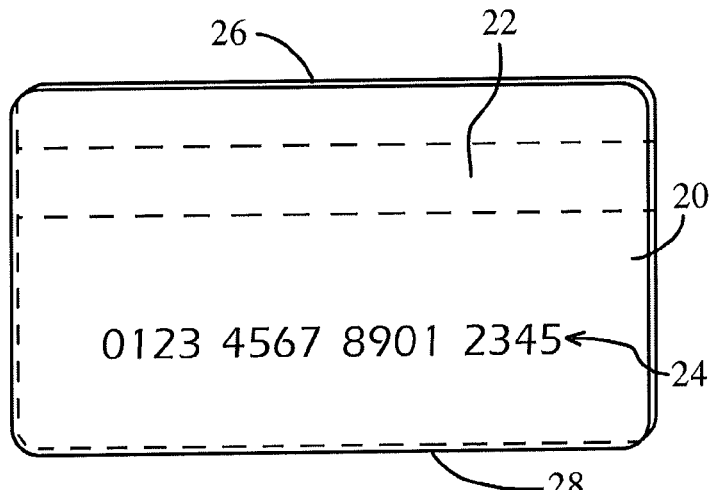
FIG. 5 is a perspective front view of a card having an information strip on the rear side according to the present invention.
Figure 9:
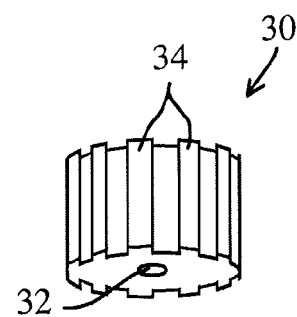
FIG. 9 is a perspective front view of the pinion gear according to the present invention.
Figure 6:
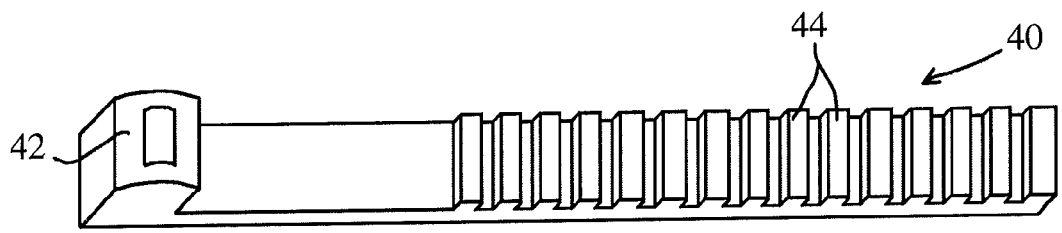
FIG. 6 is a perspective front view of the first elongated arm having a read head according to the present invention.
Figure 7:
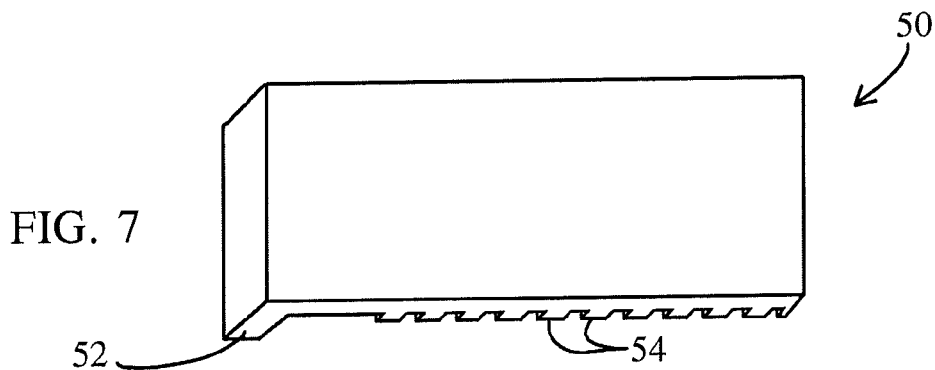
FIG. 7 is a perspective front view of the second elongated arm according to the present invention.
Figure 8:
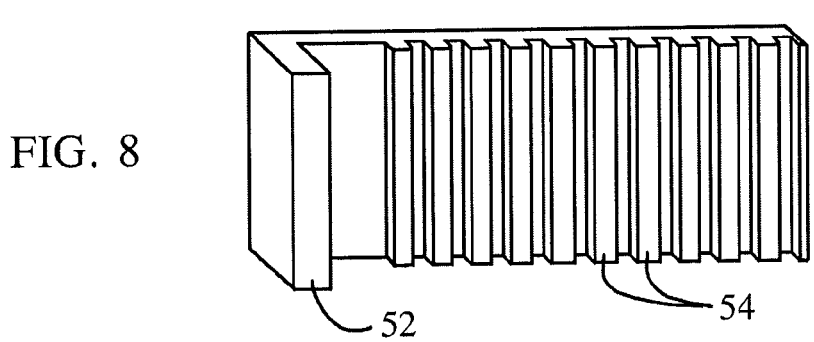
FIG. 8 is a perspective rear view of the second elongated arm according to the present invention.

FIG. 5 shows a card 20 having an information strip 22 on the back of the card 10 and visual information 24 on the front of the card. The information strip 22 is a magnetic strip with the card data embedded within the magnetic field on the strip and is read by a magnetic read head 42 on a first arm 40 as shown in FIG. 6. Alternately, the information strip may be a barcode or visual strip which may be read by a bar code scan head or visual read head. The card 20 includes a top edge 26 near the information strip and a bottom edge 28 opposite the top edge 26. The first arm 40 may also include a plurality of teeth 44 for positioning or moving the first arm 40 in the card reader 10. FIGS. 7 and 8 show the front and rear of a second arm which may include teeth 54 for positioning or moving the second arm 50 in the card reader 10. FIG. 9. shows a pinion gear 30 which includes a central axis opening 32 and a plurality of teeth 34 on the circumference of the pinion gear 30 which are engagable with the first arm teeth 44 and the second arm teeth 54 in a rack and pinion configuration. In an alternate embodiment the first arm teeth 44, the second arm teeth 54 and the pinion gear teeth 34 may be substituted with friction engagable surfaces or any surface which allows for control of the pinion rotation or arm translation.

Figure 10:
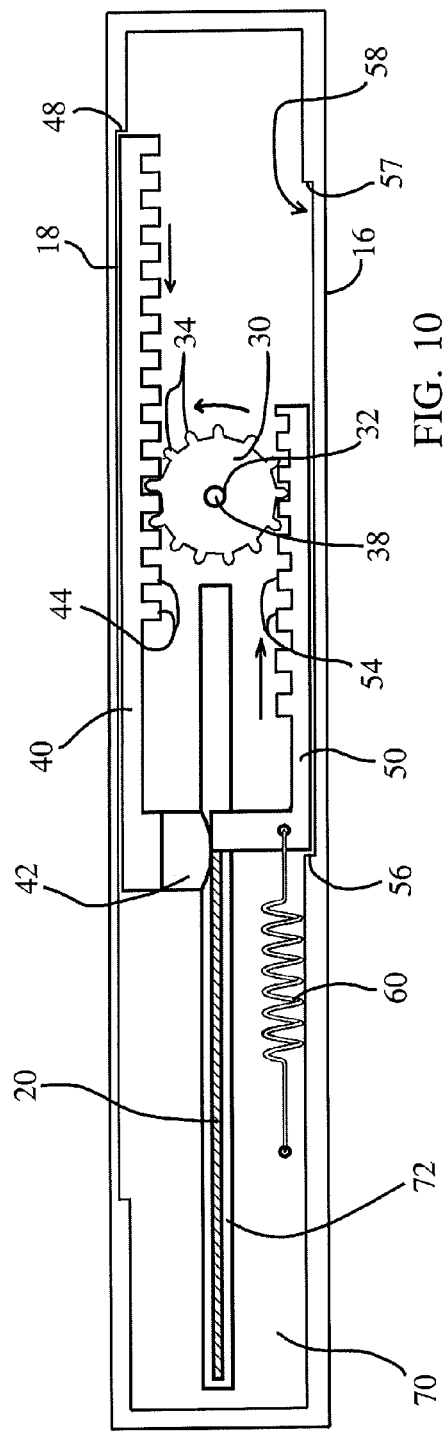
FIG. 10 is a top plan view of the card reader with the top plate removed and the reader in the initial position according to the present invention.
Figure 11:
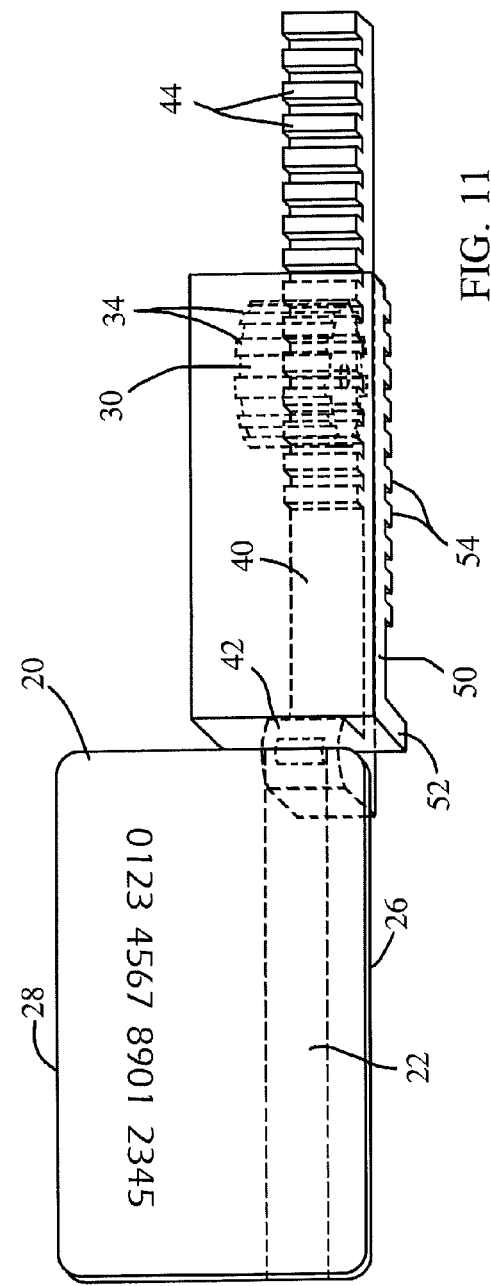
FIG. 11 is a perspective front view of the card reader pinion, arms and card in the initial position according to the present invention.

FIG. 10 is a top view of the card reader 10 with the top plate 14 removed and the card 20 in the initial position. FIG. 11 is a side perspective view of the card reader 10 without any of the outer plates 14, 16, 18 shown (for clarity) and the card 20 in the initial position. The card reader 10 includes a bottom plate which may have a bottom guide 72 corresponding with the guide slot 12 on the top plate 14 (shown in FIGS. 1-4). The card reader 10 includes the pinion gear 30 having the central axis opening 32 supported by a pin 38 which allows rotation of the pinion gear 30 about the central axis. The pin may be secured by the bottom plate 70 and the top plate 14. The first arm 40 is slidingly positioned in a first side groove 48 on side plate 18, allowing translation of the first arm 40 along the side plate 18. The second arm 50 is slidingly positioned in a second groove 58 on side plate 16, allowing translation of the second arm 50 along the side plate 16. The pinion gear teeth 34 are engaged with the first arm teeth 44 and the second arm teeth 54 such that the first arm 40 and second arm 50 travel in opposite direction when in motion. A spring 60 urges second arm 50 to the initial position with the second arm protrusion 52 against second arm guide slot 58 first end 56. The card 20 is inserted into the card reader 10 so that the card top edge 26 is inside the card reader 10 and the card bottom edge 28 is maintained outside of the card reader 10.

Figure 12:
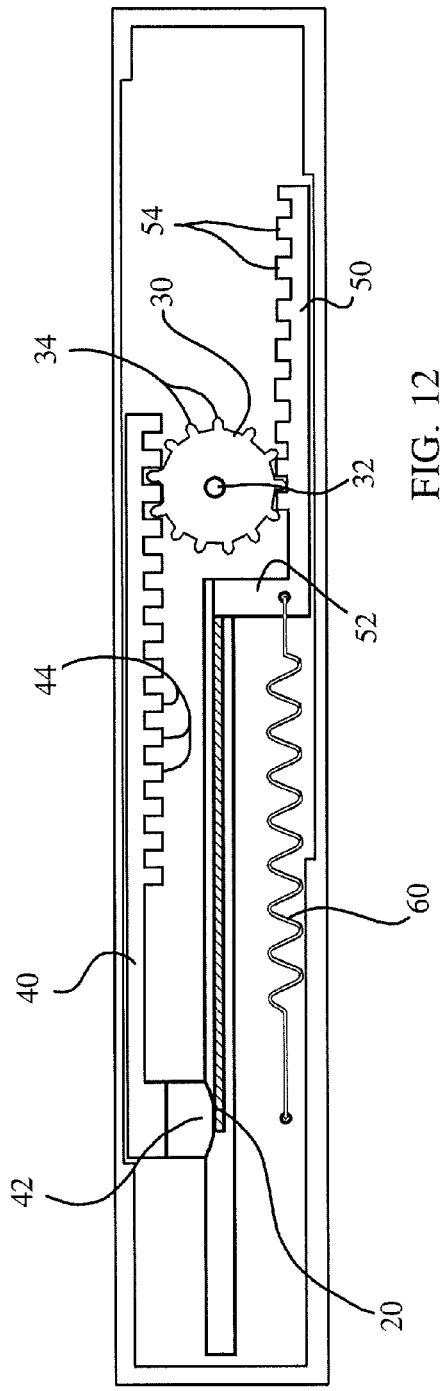
FIG. 12 is a top plan view of the card reader with the top plate removed and the reader in the swiped position according to the present invention.
Figure 13:
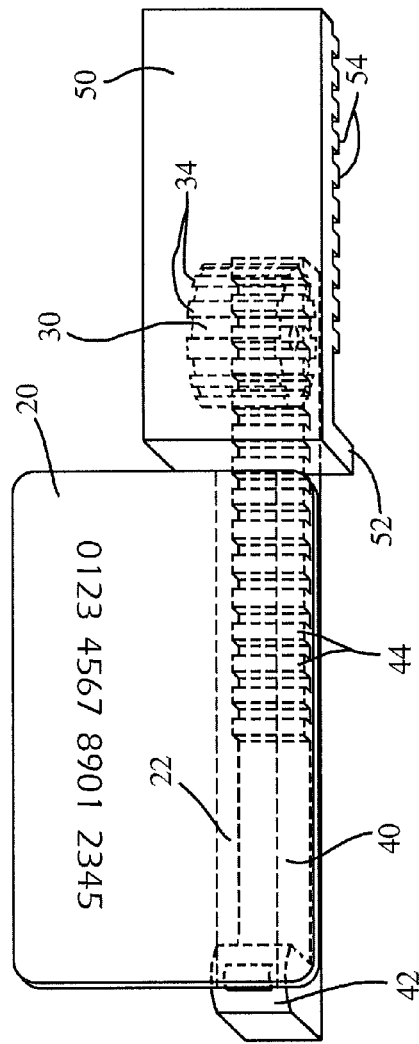
FIG. 13 is a perspective front view of the card reader pinion, arms and card in the swiped position according to the present invention.

FIG. 12 is a top view of the card reader 10 with the top plate 14 removed and the card 20 in the swiped position. FIG. 13 is a side perspective view of the card reader 10 without any of the outer plates 14, 16, 18 shown (for clarity) and the card 20 in the swiped position. The second arm 50 is positioned toward the second arm guide slot 58 second end 57.

In a method for using the card reader described above, the card reader is initially configured in the FIG. 10 state or condition. The card 20 is placed with the information strip 22 in the guide slot toward the read head 42. The card may only be inserted toward one end of the guide slot since the read head 42 and second arm protrusion 52 will not allow the card to be fully inserted into the guide slot 12 and bottom guide 72. In the initial position with the spring 60 urging the second arm protrusion 52 against second arm guide slot 58 first end 56, the card 20 is seated against the protrusion. The card 20 is then further forced toward the pinion gear 30, moving the second arm 50 toward the second arm guide slot 58 second end 57. With the second arm teeth 54 engaged with the pinion gear teeth 34, The motion of the second arm 50 toward the pinion gear 30 causes the pinion gear 30 to rotate in the direction of the arrow in FIG. 10. With the first arm teeth 44 engaged with the pinion gear teeth 34, the rotation of the pinion gear 30 moves the first arm 40 in the opposite direction as the second arm 50, carrying the read head 42 across the information strip 22 as the card 20 passes in the opposite direction as the read head 42. The condition of the card reader is then in the swiped position as shown in FIG. 12. The card is then pulled from the guide slot 12, releasing the first arm 40 and the second arm 50 to the initial position. Alternately, the card 20 may be slid in the opposite direction before removing it from the guide slot 12.

Accordingly, the card reader of the present invention provides a card reader which makes it more difficult for criminals to retrofit a secondary card reader head or assembly into an existing magnetic stripe reader. The card reader also provides increased security and allows the user to be in physical contact with their card at all times. The card reader also provides for reading standard magnetic stripe bank cards by allowing a card to be swiped only a fraction of the information strip length.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A reader for a card having an information strip, the reader comprising:
   a first movable member;
   a read head capable of reading the information strip, the read head disposed on the first movable member;
   a second movable member which upon translation causes the first movable member to translate in a direction opposite to the second movable member;
   a first member groove wherein the first movable member is slidable in the first member groove;
   a second member groove wherein the second member is slidable in the second member groove; and
   a guide slot disposed in line with the direction of translation of the second movable member such that when a card is placed in the guide slot and subsequently moved transversely along the guide slot, the card urges the first movable member in the opposite direction and moving the head across the information strip as the information strip is moved in the opposite direction as the read head movement.

2. The reader of claim 1 wherein the information strip is a magnetic information strip.

3. The reader of claim 1 wherein the information strip has a strip length and the guide slot has a length of about 1.5 times the length of the information strip.

4. The reader of claim 1 including a cylindrical member engaged with the first movable member and the second movable member.

5. The reader of claim 1 including an outer shell and a spring attached at one end to the second movable member and attached at the opposite end to the outer shell.

6. The reader of claim 1 including an outer shell having an upper plate and a lower plate wherein the guide slot is disposed in the upper plate, and including a lower slot disposed in the lower plate, the card engagable in both the guide slot and the lower slot for allowing the read head to scan the information strip.

7. The reader of claim 6 including a spring attached at one end to the second member and at the opposite end to the outer shell, the spring urging the second member to an initial position.

8. The reader of claim 1 wherein the card includes a top edge near the information strip and a bottom edge opposite the top edge, the bottom edge maintained outside of the card reader when the information strip is being read.

9. The reader of claim 1 wherein the card includes a top edge near the information strip and a bottom edge opposite the top edge, the bottom edge maintained outside of the card reader when the head moves across the information strip.

10. A reader for a card having an information strip, the reader comprising:
a first movable member;
a read head capable of reading the information strip, the read head disposed on the first movable member;
a second movable member which upon translation causes the first movable member to translate in a direction opposite to the second movable member; and
a guide slot disposed in line with the direction of translation of the second movable element such that when a card is placed in the guide slot and subsequently moved transversely along the guide slot, the card urges the first movable member in the opposite direction and moving the head across the information strip as the information strip is moved in the opposite direction as the read head movement;
whereby the read head moves relative to and along substantially the entire length of the information strip when the card is placed in the guide slot and subsequently moved transversely along the guide slot less than the length of the magnetic strip.

11. The reader of claim 10 wherein the card includes a top edge near the information strip and a bottom edge opposite the top edge, the bottom edge maintained outside of the card reader during when the head moves across the information strip.

12. A reader for a card having an information strip, the reader comprising:
a first elongated arm;
a read head capable of reading the information strip, the read head disposed on the first elongated arm;
a second elongated arm;
a protrusion disposed on the second elongated arm;
a wheel engagable with the first elongated arm and the second elongated arm wherein movement of the second elongated arm rotates the wheel and translates the first elongated arm in a direction opposite the second elongated arm;
a guide slot disposed in line with the second elongated arm such that when a card is placed in the guide against the protrusion of the second elongated arm and subsequently moved transversely along the guide slot, the card urges the second elongated arm transversely which rotates the wheel, moving the first arm in the opposite direction and moving the head across the information strip as the information strip is moved in the opposite direction as the read head movement.

13. The reader of claim 12 wherein the first elongated arm includes a plurality of first teeth, the second elongated arm includes a plurality of second teeth and the wheel includes a plurality of wheel teeth engagable with the first teeth and second teeth.

14. The reader of claim 12 including a first member groove wherein the first member is slidable in the first member groove and a second member groove wherein the second member is slidable in the second member groove.

15. The reader of claim 12 including an outer shell including a first side plate having a first member groove and a second side plate having a second member groove wherein the first member is slidable in the first member groove and the second member is slidable in the second member groove.

16. The reader of claim 15 including a stop in the second member groove wherein the second member has an initial position having the protrusion adjacent the stop and a swiped position having the protrusion away from the stop.

17. The reader of claim 16 including a spring attached at one end to the second member and at the opposite end to the outer shell, the spring urging the second member to an initial position adjacent to the stop.

18. The reader of claim 16 including a spring attached at one end to the second member and at the opposite end to the outer shell, the spring urging the protrusion to an initial position adjacent to the stop.

19. A reader for a card having an information strip, the reader comprising:
a first elongated arm having a plurality of first teeth along a portion thereof;
a read head capable of reading the information strip, the read head disposed on the first elongated arm;
a second elongated arm having a plurality of second teeth along a portion thereof;
a protrusion disposed on the second elongated arm;
a pinion gear having a plurality of pinion teeth engagable with the plurality of first teeth and the plurality of second teeth, the first elongated arm and second elongated arm disposed on opposing sides of the pinion such that the rotation of the pinion translates the first elongated arm in the direction opposite the second elongated arm;
a guide slot disposed in line with the second elongated arm such that when a card is placed in the guide against the protrusion of the second elongated arm and subsequently moved transversely along the guide slot, the card urges the second elongated arm transversely which rotates the pinion, moving the first arm in the opposite direction and moving the head across the information strip as the information strip is moved in the opposite direction as the read head movement.

20. The reader of claim 19 wherein the card includes a top edge near the information strip and a bottom edge opposite the top edge, the bottom edge maintained outside of the card reader during when the head moves across the information strip.

* * * * *